United States Patent

Nagy et al.

[11] 3,728,843
[45] Apr. 24, 1973

[54] PROCESS FOR CONTINUOUS SEPARATION OF LIQUID OR GAS MIXTURES ON A FIXED BED OF SOLIDS

[75] Inventors: Zoltan Nagy, Budapest; Zsigmond Sebestyen, Veszprem; Laszlo Szepesy, Budapest; Istvan Feher, Veszprem, all of Hungary

[73] Assignee: Magyar Asvanyolaj es Foldgaz Kiserleti Intezet, Veszprem, Hungary

[22] Filed: Sept. 29, 1970

[21] Appl. No.: 76,543

[30] Foreign Application Priority Data

Oct. 2, 1969 Hungary..................................2,024

[52] U.S. Cl............................................55/25, 55/74
[51] Int. Cl. ...............................................B01d 53/04
[58] Field of Search......................55/25, 62, 74, 75, 55/179, 387, 358

[56] References Cited

UNITED STATES PATENTS

| | | | |
|---|---|---|---|
| 3,455,815 | 7/1969 | Fickel | 55/75 |
| 3,252,268 | 5/1966 | Stalk | 55/62 |
| 3,306,006 | 2/1967 | Urban | 55/25 |
| 3,365,859 | 1/1968 | Sandberg | 55/62 |

Primary Examiner—Charles N. Hart
Attorney—Young & Thompson

[57] ABSTRACT

Fluid mixtures are continuously separated on a fixed bed of solids, for example by absorption, by establishing at least four zones in each of which different fluid flow conditions obtain. In one of the zones at least one of the components is separated and in another of the zones at least one of the separated components is removed. In still another of the zones, a fluid is introduced at relatively high pressure and withdrawn at relatively low pressure so as to create the needed pressure differential throughout the system, the direction of flow of this last fluid being opposite the direction of flow of the mixture undergoing separation. The zones are periodically simultaneously shifted all in the same direction.

18 Claims, 1 Drawing Figure

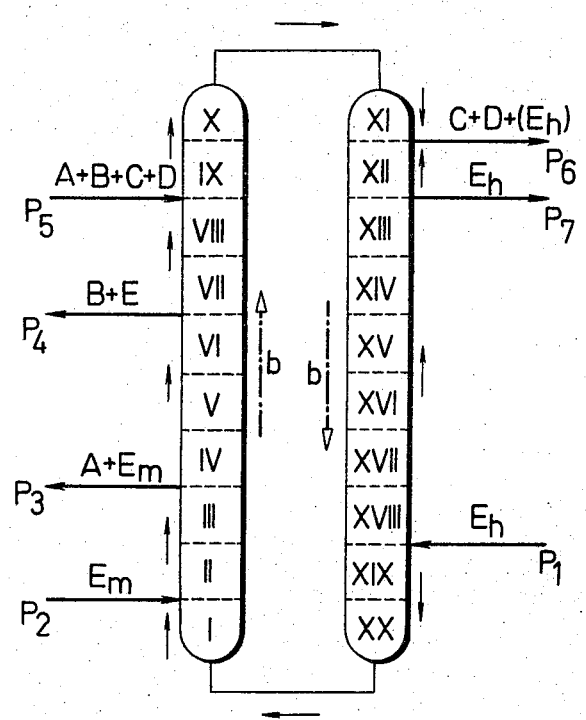

PROCESS FOR CONTINUOUS SEPARATION OF LIQUID OR GAS MIXTURES ON A FIXED BED OF SOLIDS

The present invention relates to methods for the continuous separation of fluid mixtures on fixed beds of solids which are adapted to detain one or more components of the mixture.

Various industrial processes are known for the separation of fluid mixtures, for example, distillation, extraction, adsorption, adduct formation, et cetera. These processes have in common the feature that the mixture to be separated is conducted through a fixed bed which is capable of temporarily detaining one or more components of the mixture, thereby to separate the detained material from the rest of the mixture. The detained material can then be removed, for example by heating, pressure reduction, the application of a desorption medium, et cetera. Thus the fixed bed is regenerated. It is accordingly possible, by the use of an appropriate number of separation zones and the periodic switching of the function of these zones, to achieve a substantially continuous separation operation.

Modern technology has required that these separation operations be conducted on an increasingly large scale; and to this end, the original batch processes have given way to continuous separation processes. One such relatively modern process involves the use of a moving bed, in which particulate packing material is conveyed continuously through the separation and regeneration zones. The specific capacity of moving bed equipment, that is, the ratio of the volume of the mixture treated to the volume of the solid material, is higher than that of fixed bed equipment. However, moving bed equipment has the disadvantages that the power requirement is high as are the material losses resulting from the attrition of the packing material. Difficulty is also encountered in the form of breakdowns due to the presence of the attrition products such as powders and the need for removing these attrition products.

In U.S. Pat. No. 2,985,589, it has been proposed to provide a single vertical column packed with a solid adsorbent, and a pump that continuously circulates liquid through the adsorbent. The mixture to be separated is introduced into the circulating liquid flow at a given point in the column. One component of the mixture is adsorbed to the packing, while the rest flows with the carrier and is removed with it. At another point in the column, a desorption agent is introduced and the adsorbed component is displaced from the packing and is removed together with the desorbent. Thus the adsorbent is regenerated. Continuous separation is achieved by shifting the feed and withdrawal positions by equal increments in the direction of the circulation of the carrier flow. In this way, conditions resembling those of the moving bed can be achieved without the accompanying drawbacks.

However, the process of the earlier patent identified above has itself the drawback that the material to be separated is diluted at every point in the column by the carrier fluid, thereby increasing the difficulty and cost of separation. A further disadvantage is that the pump circulating the carrier is exposed to conditions varying with the shifting of the functional zones. This means that not only does the pump have to be dimensioned for maximum capacity, but also the pump has to be controlled in accordance with an intricate program.

The present invention overcomes the difficulties of the prior art as discussed above, by utilizing a fixed bed of solids in which at least four zones of identical flow resistance are established with the opportunity selectively to admit fluid to each zone and selectively to withdraw fluid from each zone, the zones being disposed in a closed system. The various zones are modular and identical to each other and can be in a series for the performance of a phase of the operation, depending upon the selection of the points of fluid admission and withdrawal. The various operations are then advanced stepwise about the closed system of zones in a predetermined timed progression characterized by the shifting of all points of admission or withdrawal of fluid in the same direction about the closed system by an increment of one zone.

Thus no carrier fluid is required by the present invention and the carrier fluid pump is accordingly eliminated and with it the intricate control needed to effect the above-mentioned program. Instead, in the present invention, pressure can be regulated by a pressure-compensating flow which is countercurrent to the direction of flow of the fluid undergoing separation; although of course there will not be simultaneous countercurrent flow of fluids in any given zone. Steady state pressure conditions are thus maintained in all zones relative to the points of fluid introduction and withdrawal, the pressures of the various zones shifting as the points of fluid introduction and withdrawal. This pressure-regulating fluid is to a large extent withdrawn separately from the packing material and thus has little effect of diluting the separated products.

By closing off certain of the zones from each other, it is also possible to conduct the various operations at distinctively different pressures appropriate to the various operations involved, such as high pressure for adsorption and low pressure for elution.

Other features and advantages of the present invention will become apparent from a consideration of the following description, taken in connection with the accompanying drawing, which is a somewhat schematic flow diagram of equipment showing one embodiment of the present invention. For purposes of illustration, the drawing illustrates separation equipment used for adsorption-desorption separation of a mixture of four fluids. It will of course be understood, however, that a number of other separation techniques are possible, as indicated above. It will also be understood that the term "fluid" as used in this specification includes both gases and liquids.

In the drawing, a four-component fluid mixture of A + B + C + D is to be separated into component A, component B, and a mixture of components C and D. A granular solid adsorbent packing selectively adsorbs A and B while C and D pass through without substantial adsorption.

In the illustrated embodiment, two elution operations are effected, one to remove component A, and the other to remove component B. In addition, a countercurrent fluid flow operation is effected under diminishing pressure, to regulate the pressure of the various zones. In the illustrated embodiment, all three of these last functions are performed by the same fluid at different temperatures. Thus, the flow $E_m$ is a high temperature flow to remove component A; while a further portion of that flow, designated E, at reduced or ambient temperature removes the component B. A further quantity of the same fluid, at a lower temperature than either of the other two streams of the same fluid, is designated $E_h$ and serves both for pressure regulation and for cooling the zones warmed by $E_m$. It will of course be understood from the drawing that the direction of progression of the zone shift is indicated by the arrows b. The solid adsorbent is packed in two vertical columns of identical size and the columns are divided into twenty zones of identical flow resistance, designated I to XX in the drawing, by means of fluid inlet and outlet devices having also means (not shown) selectively to segregate the zones from each other. It will be understood that the inlet and outlet and zone segregation equipment including valves and conduits are merely conventional in construction and hence need not be described in greater detail.

The columns are connected at their top and bottom by conduits in a closed system in which fluid can circulate in either direction. It will thus be appreciated from the drawing that the zones are modular and can be used individually or in a series of appropriate length, to carry out operations such as adsorption, desorption, heating, cooling, elution, or any of the other unit operations alluded to above.

In the example shown in the drawing, zones IX – XI serve for adsorption, zones VII and VIII for sweeping, zones IV – VI for elution, zones II and III for desorption, zones I, XX and XIX for cooling, and zones XII – XVIII for pressure compensation.

It will be understood that the various streams can be heat exchanged with each other outside the columns, in conventional ways. For example, the stream $E_h$ leaving at $P_7$ need be only somewhat further warmed in order to be used as the stream $E_m$ at $P_2$.

It will be recognized that $$P_1 > P_2 > P_3 > P_4 > P_5 > P_6 \approx P_7.$$

The relationship that $P_6 \approx P_7$ is maintained so that as a matter of operational safety a small amount of $E_h$ may flow to the mixture C + D: otherwise $E_h$ might be contaminated with C + D and would have to be purified before reuse.

The packing used will of course vary according to the nature of the operation. It can be in the form of granular solids or porous bodies, silica gel, activated carbon, alumina, zeolites, ion exchange resins, urea, molecular sieves, polymer gels, solid packing rings, et cetera. The equipment used to carry out the process will also vary largely according to the nature of the operation and its scale. A large scale operation such as the separation of hydrocarbons may for example take the form of vertical columns while preparative separations carried out in a laboratory may well be performed in spiral or U-tubes. In the case of industrial equipment, the length-diameter ratio of a given zone can for example be around unity; while in laboratory equipment, the length-diameter ratio of a zone may be of the order of 50–100 to 1.

Although the present invention has been described and illustrated in connection with a preferred embodiment, it is to be understood that modifications and variations may be resorted to without departing from the spirit of the invention. Such modifications and variations are considered to be within the purview and scope of the present invention as defined by the appended claims.

Having described our invention, we claim:

1. A process for the continuous separation of fluid mixtures into components thereof on a fixed bed of solid packing capable of reversibly detaining at least one of said components, comprising establishing in the bed at least four separate zones in a closed circuit with each of the zones having substantially identical fluid flow resistance, introducing a fluid mixture to be separated into one said zone and moving said fluid mixture to be separated through said one zone in one direction, withdrawing fluid of said mixture depleted in at least one component thereof from a point on said circuit that is downstream from the point of introduction of said mixture with respect to said one direction, introducing another fluid into another said zone spaced from said one zone and at a pressure such that in at least one said zone between the point of introduction of said another fluid and said point of withdrawal there is substantially no flow of fluid in said one direction thereby to a countercurrent fluid flow which is effected under diminishing pressure which regulates the pressure of the various zones, and periodically shifting said points of introduction and said point of withdrawal equal distances about said circuit.

2. A process as claimed in claim 1, said zones being equal in length, said equal distances being each equal to the length of one said zone.

3. A process as claimed in claim 2, in which fluid flow in said at least one zone is in the direction opposite to said one direction.

4. A process as claimed in claim 1, and withdrawing said another fluid from said closed circuit separately from any component of said mixture.

5. A process as claimed in claim 1, the fluid pressures at all the points of introduction and withdrawal being different from each other.

6. A process as claimed in claim 1, in which the entry pressure of said another fluid is the highest pressure in the circuit.

7. A process as claimed in claim 6, in which the exit pressure of said another fluid is adjacent the lowest pressure in said circuit.

8. A process as claimed in claim 2, the points of introducing said fluid mixture and withdrawing fluid of said mixture and introducing said another fluid being spaced from each other distances equal to even multiples of the length of a said zone.

9. A process as claimed in claim 1, and introducing a further quantity of said another fluid into still another zone at a third point spaced between the first-mentioned point of introduction of said another fluid and the point of introduction of said fluid mixture to be separated, and withdrawing said another fluid in admixture with said at least one component from a point between said third point of introduction and said point of introduction of said mixture to be separated.

10. A process as claimed in claim 9, and withdrawing said another fluid from two different points spaced from each other and both located between and spaced from said third point of introduction and said point of introduction of said mixture to be separated.

11. A process for the continuous separation of fluid mixtures into components thereof on a fixed bed of solid packing capable of reversibly detaining at least one of said components, comprising establishing in the bed a plurality of separate zones in a closed circuit with each of the zones having substantially identical fluid flow resistance, introducing the fluid mixture to be separated at a first point into one said zone and moving said fluid mixture to be separated through said one zone in one direction, withdrawing fluid of said mixture depleted in at least one component thereof from a second point on said circuit that is downstream from said first point with respect to said one direction, introducing another fluid into another said zone at a third point spaced from said first and second points and at a pressure such that in at least one said zone between said second and third points there is substantially no flow of fluid in said one direction thereby to establish a countercurrent fluid flow which is effected under diminishing pressure which regulates the pressure of the various zones, and periodically shifting all three said points simultaneously equal distances about said circuit.

12. A process as claimed in claim 11, said zones being equal in length, said equal distances being each equal to the length of one said zone.

13. A process as claimed in claim 11, in which fluid flow in said at least one zone is in the direction opposite to said one direction.

14. A process as claimed in claim 11, and withdrawing said another fluid from said closed circuit at a fourth point spaced between said second and third points.

15. A process as claimed in claim 14, and introducing a further quantity of said another fluid into another said zone spaced from the previously recited zones at a fifth point spaced between said first and third points.

16. A process as claimed in claim 15, and withdrawing said another fluid in admixture with said at least one component from a sixth point spaced between said first and fifth points.

17. A process as claimed in claim 16, and withdrawing different components in which said mixture is depleted, in admixture with said another fluid from sixth and seventh points spaced from each other and spaced from and disposed between said first and fifth points.

18. A process as claimed in claim 11, said first, second and third points being spaced from each other by plural whole numbers of said zones.

* * * * *